Patented Oct. 6, 1925.

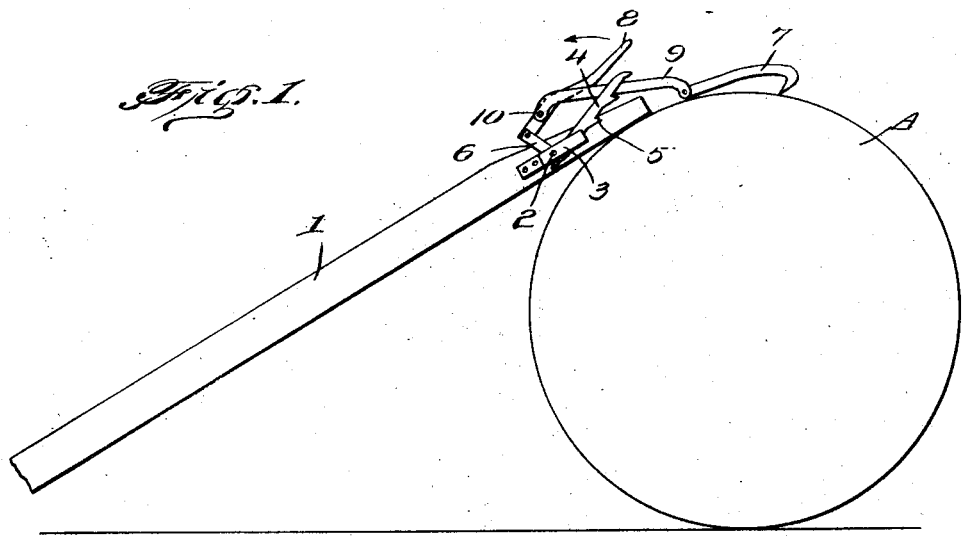
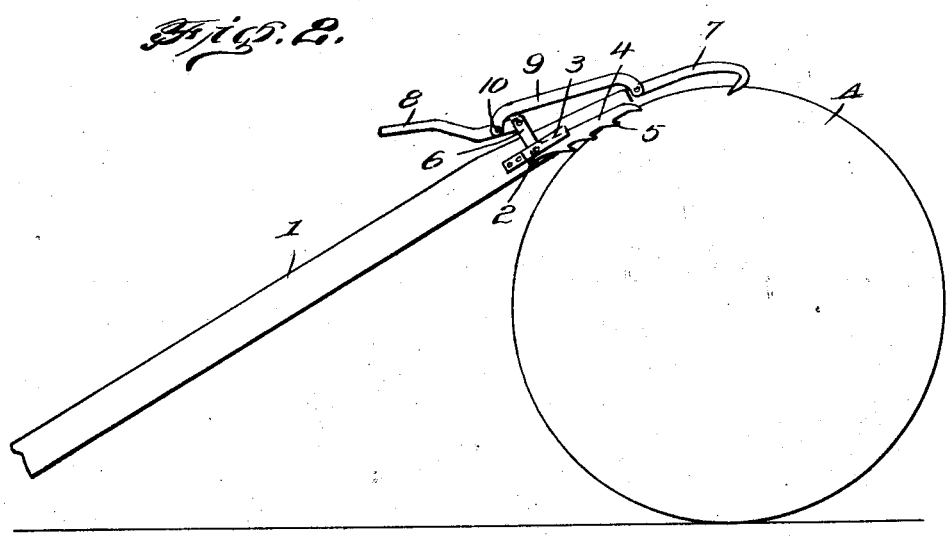

1,556,391

UNITED STATES PATENT OFFICE.

DAVE WYMORE, OF GURDANE, OREGON.

SAWMILL DOG.

Application filed July 8, 1924. Serial No. 724,795.

*To all whom it may concern:*

Be it known that I, DAVE WYMORE, a citizen of the United States, residing at Gurdane, in the county of Umatilla and State of Oregon, have invented certain new and useful Improvements in a Sawmill Dog, of which the following is a specification.

This invention relates to new and useful improvements in saw mill dogs and has for its principal object to provide a pair of coacting locking dogs for holding a portable drag saw in a rigid position on the log while the same is in use.

A further object of the invention is to provide a saw mill dog of the above mentioned character, wherein means is provided for operating the coacting dogs simultaneously to move the same into an operative or inoperative position in a simple and efficient manner.

A still further object of the invention is to provide a saw mill dog of the above mentioned character, which is simple in construction, inexpensive, strong and durable and furthermore adapted for the purposes for which it is designated.

Other objects and advantages of this invention will become apparent during the course of the following description.

In the accompanying drawing forming part of this specification and in which like numerals designate like parts throughout the same:

Figure 1 is a side elevation of my improved invention showing the same in an inoperative position, and Figure 2 is a similar view with the locking dogs in a locked position.

In the drawing wherein for the purpose of illustration is shown the preferred embodiment of my invention, the numeral 1 designates a portion of a portable drag saw which is of any well known construction and as the same forms no important part of the present invention, a further detailed description is not thought necessary. Pivotally supported at 2 in a suitable bracket 3 mounted on one end of the portable drag saw 1 is a locking dog which comprises an elongated bar 4. The bar is provided on its lower longitudinal edge with the sharp teeth 5 for engagement with the log A in the manner to be presently described, and extending upwardly from the pivotal end of the bar 4 is the projection 6.

A coacting locking dog in the form of a hook is illustrated at 7 and the same is disposed forwardly of the bar 4. Pivotally connected at its lower end to the upper end of the extension 6 is the actuating lever 8 and the hook 7 is connected to the lower portion of the lever 8 by means of the link 9 in the manner clearly illustrated in the drawing. The purpose of the provision of the link is to afford a means whereby the locking dogs may be actuated simultaneously in the manner hereinafter to be presently described.

Normally the parts are arranged as is shown in Figure 1 of the drawing and the locking dogs are out of engagement with the log A. After the log has been set in a predetermined position so that the same may be cut by the saw (not shown), the lever 8 is moved in the direction of the arrow simultaneously causing the hook 7 to bite into the log and causing the teeth of the lower edge of the bar to also bite into the log in the manner clearly shown in Figure 2. In this manner, the log may be readily cut by the saw without any danger of the dogs becoming disengaged from the log when driven into the same and further preventing the disengagement of the drag saw from the log.

The use of a pair of coacting locking dogs of the above mentioned character, will save considerable time and labor in supporting a drag saw in the proper position while a log is being cut and further the usual kicking experienced in log sawing will be eliminated.

When it is desired to release the dogs from engagement with the log, the lever is swung upwardly on its pivot 10 whereby the locking dogs are simultaneously moved out of engagement with the logs and into an operative position.

The simplicity of my device enables the same to be manufactured at a very low cost and will further be strong and durable and will further be positive and efficient in its operation.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A device of the class described including an elongated member, a bracket mounted thereon, a saw mill dog comprising an elongated bar pivoted on said bracket, teeth formed on the lower edge of the bar and adapted for engagement with a log, an angular extension fixed to the pivoted end of the bar, a second saw mill dog comprising a hook disposed forwardly of the bar, an actuating lever pivoted at one end to the upper end of the extension, and a link pivoted to said hook and to an intermediate portion of the lever whereby the saw mill dogs may be simultaneously operated by swinging the lever.

In testimony whereof I affix my signature.

DAVE WYMORE.